US000001072H

United States Statutory Invention Registration [19]

[11] Reg. Number: H1072

Estes et al.

[43] Published: Jul. 7, 1992

[54] ONE-MAN GAS PARTICULATE FILTER UNIT

[75] Inventors: John D. Estes, Deland; John E. Lambright, S. Daytona; Keith J. Conklin, Ormond Beach, all of Fla.

[73] Assignee: The United States of America as represented by the Secretary of the Army, Washington, D.C.

[21] Appl. No.: 518,605

[22] Filed: May 2, 1990

[51] Int. Cl.[5] ..... B01D 15/04

[52] U.S. Cl. ..... 55/208; 55/210; 55/316; 55/387; 55/472

*Primary Examiner*—Robert L. Stoll
*Assistant Examiner*—John M. Covert
*Attorney, Agent, or Firm*—Anthony T. Lane; Edward Goldberg; Michael C. Sachs

[57] ABSTRACT

A gas particulate filter system is provided for supplying clean heated air to an operator subjected to ambient environments containing nuclear, biological or chemical contaminants. The filter unit includes replaceable radial flow canister means, centrifugal blower/heater means, continuously variable electronic control means for regulating air temperature and air flow, and clamping means for easy assembly of the components under adverse field conditions.

9 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1B
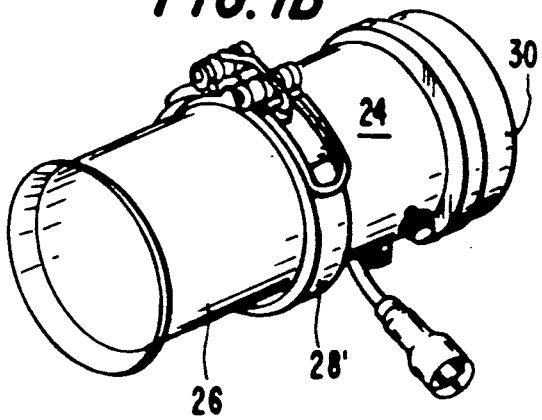
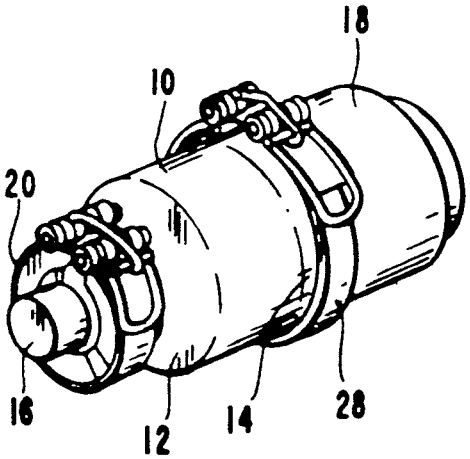
FIG. 1A

ONE-MAN GAS PARTICULATE FILTER UNIT

GOVERNMENTAL INTEREST

The Government has rights in this invention pursuant to contract No. DAAK-11-81-C-0100 awarded by the Department of the Army.

BACKGROUND OF THE INVENTION

The One-man Gas Particulate Filter Unit (GPFU) relates to a device for providing breathable air to men in military vehicles which encounter nuclear, biological and or chemical (NBC) agents that are required to be removed for safety reasons from the air. The GPFU is designed to interface with a protective gas mask or ventilated face piece system.

In the past, prior art military vehicles air supply systems failed to protect personnel from accidental contamination during the handling and disposal of a contaminated filter. The present invention provides a replacement canister which can store an old contaminated filter while providing a new charcoal filter.

The present invention is capable of reliably operating under extreme environmental battlefield conditions.

SUMMARY OF THE INVENTION

The present invention relates to a radial flow gas-particulate filter canister in axial alignment with a centrifugal blower, heater unit and dust pre-filter. A continuously variable power control module provides for heater activation, temperature control, and air flow from less than one cubic foot per minute to four cubic feet per minute at eleven inches of water head to a M25 type Protective Mask.

Accordingly, an object of the present invention is to provide a replaceable gas particulate filter unit for military personnel operating in a hostile NBC environment.

Another object of the present invention is to provide a gas particulate filter unit which can be easily reassembled under field conditions.

Another object of the present invention is to provide a gas particulate unit which has continuously variable temperature and airflow control.

A further object of the present invention is to provide a GPFU which is able to purify hazardous air by means of a pair of filters and able to heat and circulate clean air by means of a blower-heater module.

For a better understanding of the present invention, together with other and further objects thereof, reference is made to the following descriptions taken in connection with the accompanying drawings.

BRIEF DESCRIPTION OF THE DRAWINGS

FIGS. 1A and 1B are isometric views of a One-man Gas Particulate Filter Unit (GPF) in as-shipped components state. FIG. 1A is a radial flow filter module and FIG. 1B is a radial flow blower-heater module.

Throughout the following description, like reference numerals are used to denote like parts of the drawings.

DESCRIPTION OF THE PREFERRED EMBODIMENT

Figure 2:
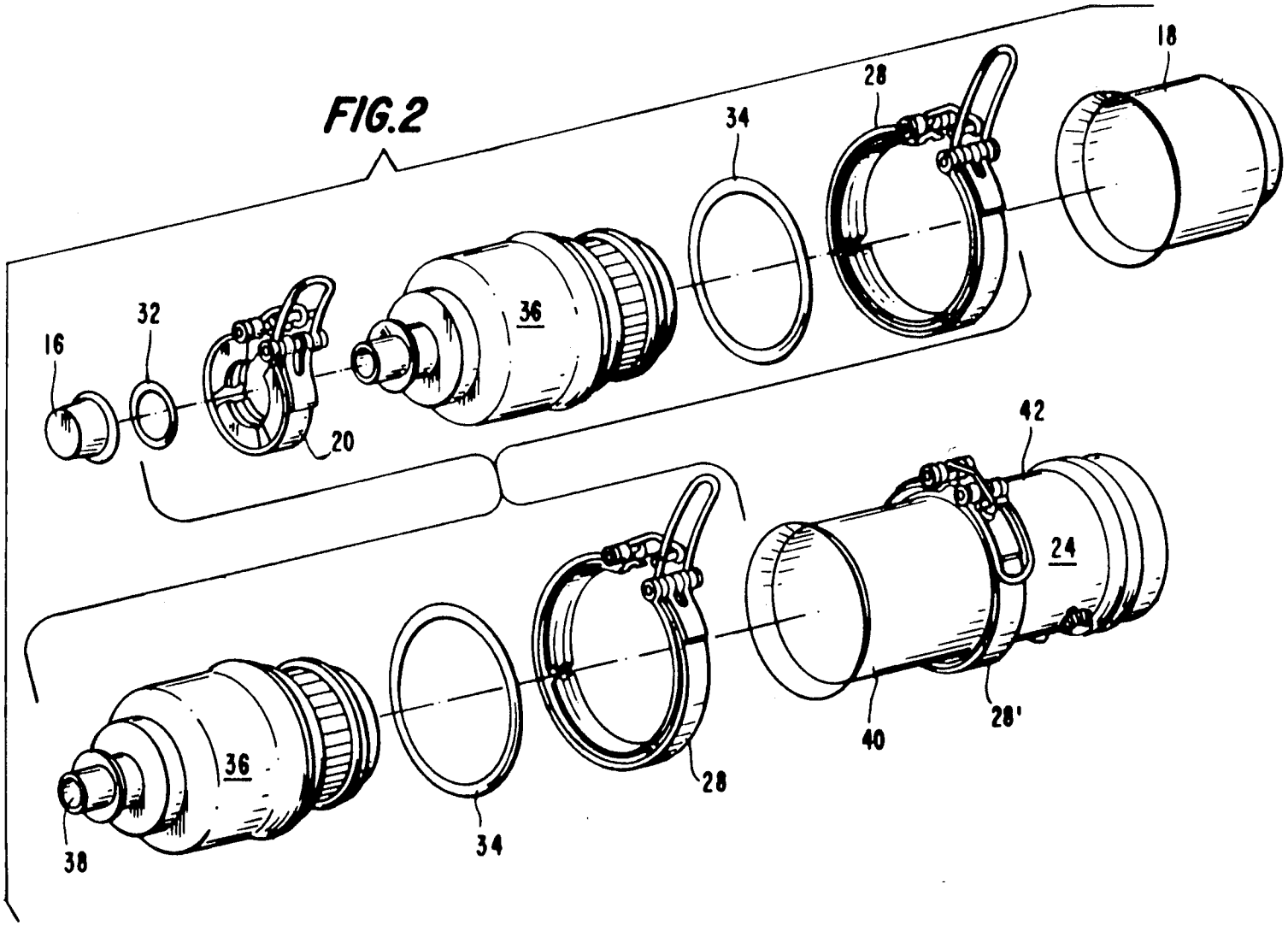
FIG. 2 is an isometric exploded view showing the initial installation of the filter module to the blower-heater module.

Referring now to FIG. 1A, the present invention comprises a sealed filter unit, having a cylindrical canister housing 10 which has an axially aligned hose connecting small flange end 12 and a flanged filter end 14. In the as-shipped state the aforementioned ends 12 and 14 are sealed by hose outlet end cap 16 and inlet filter end cap 18 respectively to the canister housing 10 by means of over-center "V" filter outlet clamps 20 and filter inlet body clamp 28 respectively.

Referring to FIG. 1B, a cylindrically shaped blower-heater module 24 has a flanged cylindrical center housing member 26 which is sealed to the rear end by a "V" clamp 28' and on its opposite air inlet end by a manually adjustable open and closed pre-filter cover 30.

Referring now to FIG. 2 during the initial installation of the asshipped gas particulate filter canister 36 has outlet cap 16 and inlet cap 18 removed and discarded therefrom. Pre-formed packing "O" ring seals 32 and 34 are used to provide a simple and effective means to seal the filter canister 36 during storage handling, disposal and to seal the filter canister 36 to the power-precleaner blower-heater module 24. Filter outlet clamp 20 is used to connect the outlet protective cover 16 or to a connect hose pneumatically connected to a face mask, not shown, to the outlet end 38 of filter canister 36. Filter body clamp 28 is used to connect the filter inlet cover 18 to the gas-particulate filter canister 36 and to connect the filter canister 36 to the power blower-heater precleaner 24. In addition, filter body clamp 28' is used to connect cylindrically flanged center housing 40 to rear housing 42 of blower-heater module 24. The "V" clamps are commercially available and modified to allow opening and closing with an over-center lever mechanism.

Figure 3:
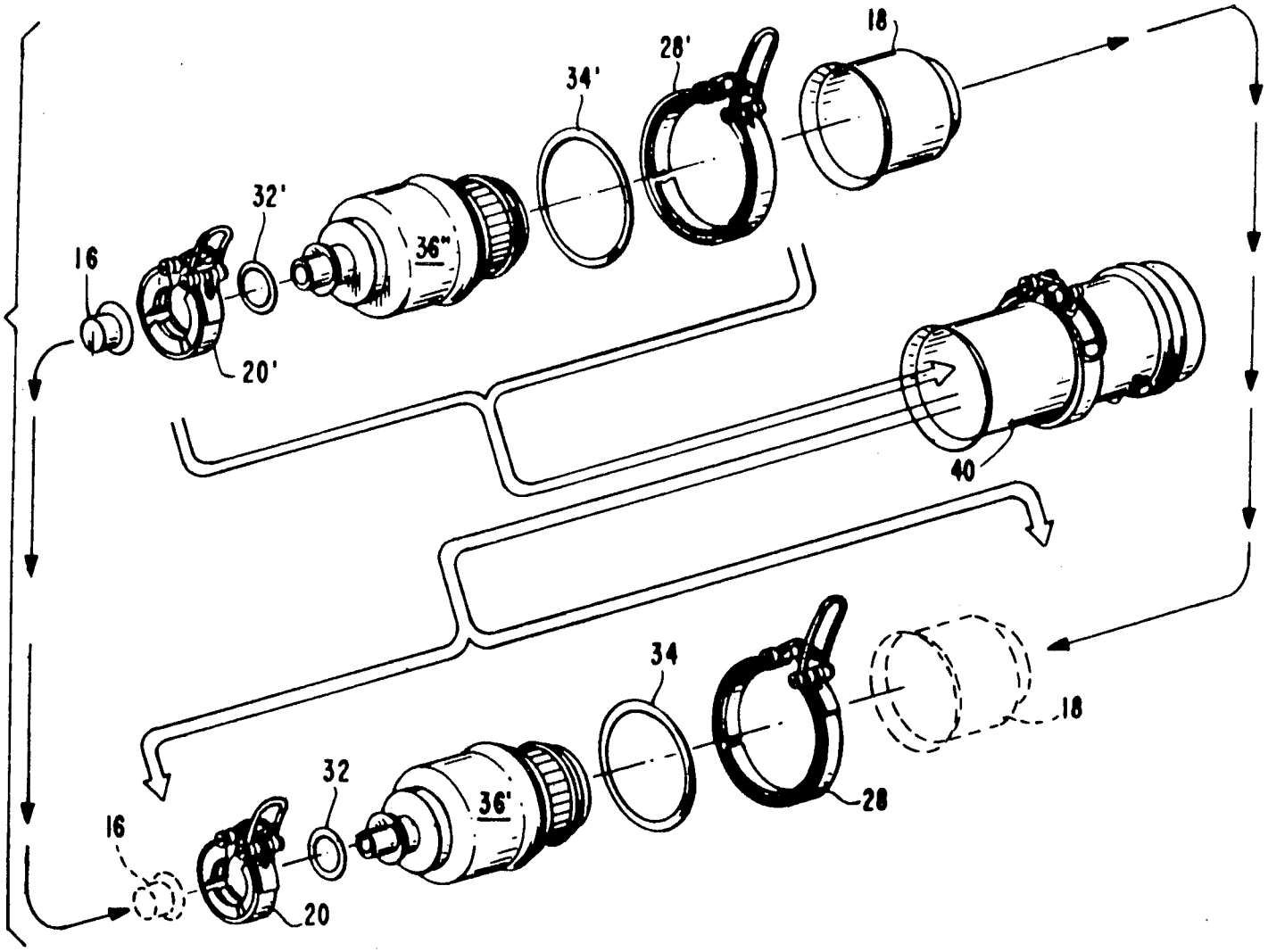
FIG. 3 is an isometric exploded view showing the replacement sequence for a filter module.

Referring now to FIG. 3, the procedure for replacement of a filter module requires removal of contaminated filter canister 36', "O" rings 32 and 34, and clamps 20 and 28. The aforementioned elements are assembled with end caps 16 and 18 of replacement filter canister 36" for disposal. The new filter 36" with new "O" rings 32' and 34' and "V" clamps 20' and 28' are operatively attached to the center housing 40. The dual arrows coming out of the center housing 40 represent the removal step of the filter canister 36' and the single arrow going into the rear end of the center housing represents the replacement sequence for the filter canister 36".

Figure 4:
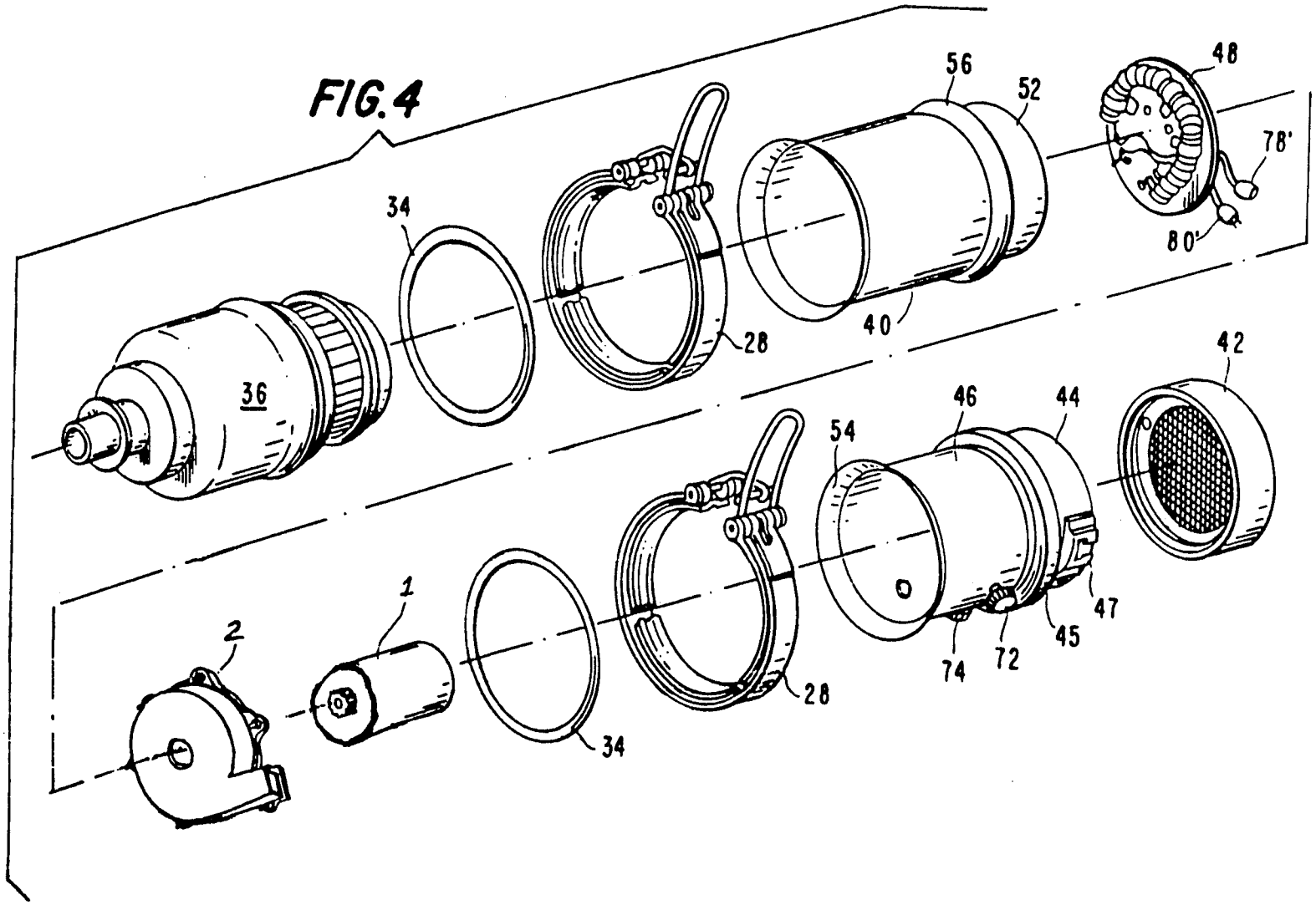
FIG. 4 is an isometric additionally detailed exploded view of the One-man GPFU.

Referring now to FIG. 4, the exploded view of the GPFV shows the filter canister 36, "O" ring 34 and the "V" clamp 38 as previously described in alignment with the power/pre-cleaner blower-heater module which comprises an air intake dust cover assembly 42 which is operatively attached to the inlet end 44 of a flanged cylindrically shaped rear housing member 46. The rear housing unit 46 includes a rain shield 45 and a retaining member 47 to hold the air inlet dust cover 42 removably attached to the rear housing unit 46. A heater-blower assembly 48 and 50, 50' respectively is operatively positioned intermediate of the rear end 52 of the center housing 40 and the flanged outlet end 54 by means of an "O" ring packing seal 34 and "V" clamp 28 which fixedly locks the flanged outlet end 54 of rear housing 46 to the rear flange 56 of the center housing 40. Blower assembly 50 is axially aligned with heater assembly 48. The blower is a backward curved centrifugal fan which is driven by a brushless 27.5 volt direct current motor 1 operating at 23,000 r.p.m. The centrifugal blower and centrifugal fan housing (2) are attached to a mounting plate (not show). Its fan inlet face is sealed to the plate and a hole in the plate matches the fan's inlet. The plate is sealed to the center housing 40 with a high temperature gasket. The blower's inlet faces the rear of the assembly and the tangential blower outlet discharges into the center housing. The control electronic module will be described more fully hereinafter in relation to FIG. 8. The control electronics module 66 has temperature and speed set cables 68 and 70 respectively which are connected to speed and temperature hand control knobs 72 and 74, respectively, which are located on rear housing member 46. The control electronics module also includes a power input cable 76. A pair of temperature control leads 78 and 80 are electrically connected to the heater assembly 48 mating temperature control leads 78' and 80' respectively.

Figure 5A:
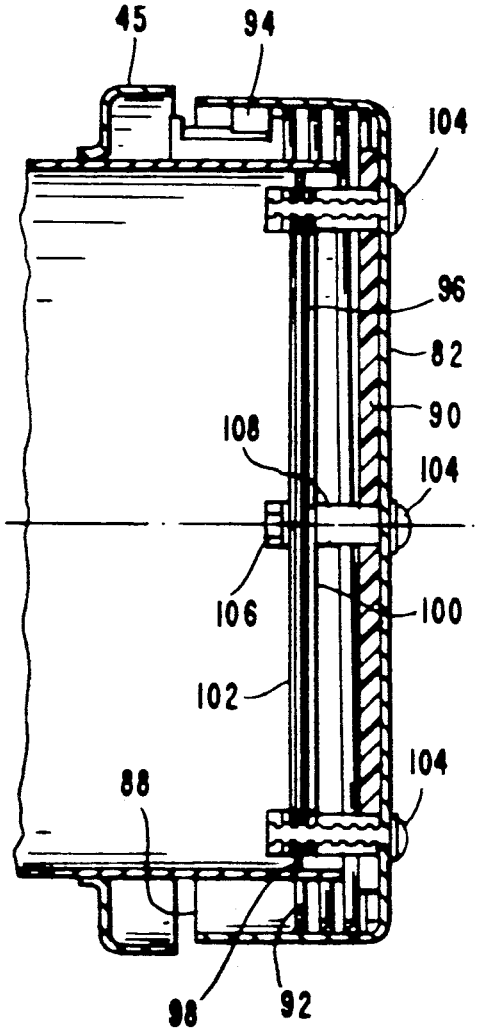
FIG. 5A is a cross-sectional view of the blower-heater module air inlet end showing the end cap in an open position.
Figure 5B:
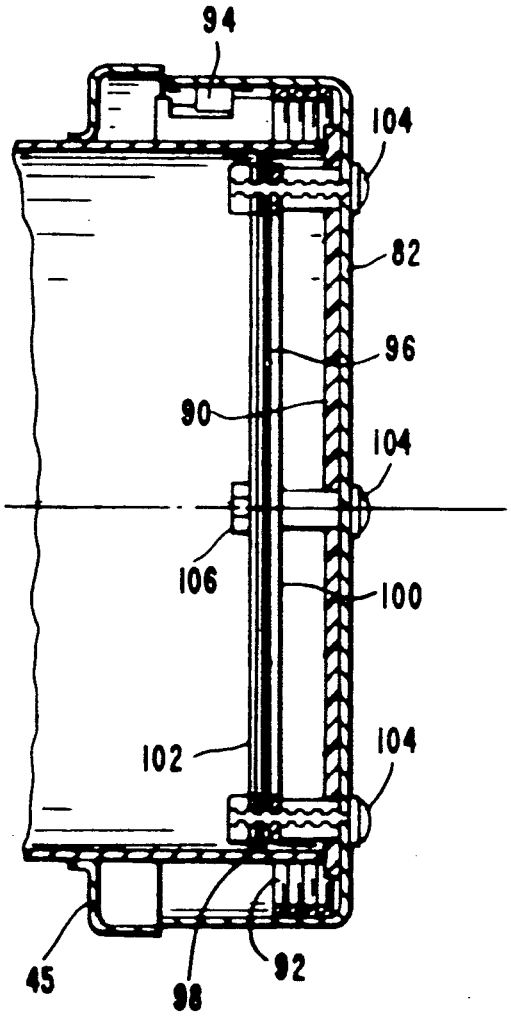
FIG. 5B is a cross-sectional view of the blower-heater module air inlet end showing the end cap in a closed position.
Figure 6:
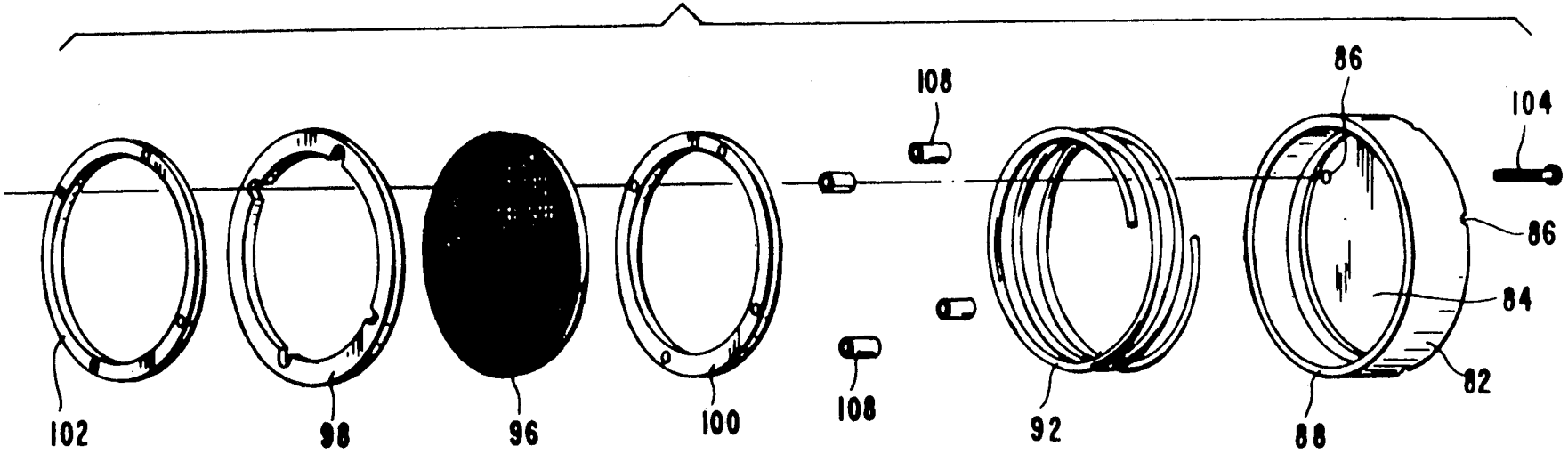
FIG. 6 is an exploded view of the blower-heater module end cap assembly.

Referring now to FIGS. 5A, 5B and 6, the end cap assembly comprises a cylindrical end cap cover 82 having a closed end 84 having peripherally disposed screw holes 86 therein and an open end 88. An air inlet seal member 90 is fixedly held next to the cap end 84. A coiled compression spring 92 is operatively positioned within cap cover 82 between cap end 84 and spring stop member 94. A sintered metal disc shaped prefilter member 96 is sandwiched. between a metal ring wiper member 98 and a rear ring support 100. A front ring support wiper 102 holds wiper ring 98 against the rear side of the prefilter 96. Screws 104 pass through holes in the end cap cover 82 and axially aligned holes of the front ring support, the prefilter 96, the wiper 98 and the rear ring support wiper 100. Nuts 106 threadly attached to screws 104 fixedly hold the prefilter member 96 attached to the cap closed end 88 and spaced therefrom by cylindrical spacer 108. The wiper member 98 is designed to slidably ride against the interior surface of rear housing 46. The coiled spring rests against the inside of the end cap closed end 84 and the spring stop 94 and is designed to provide some resistance when in the closed position shown in FIG. 5A. The unit is designed to provide protection from the rain and is a means to actuate the blower module on/off switch, not shown in these figures, and to mechanically link unit operation with the open and closing of the air intake cover assembly 42.

Figure 7:
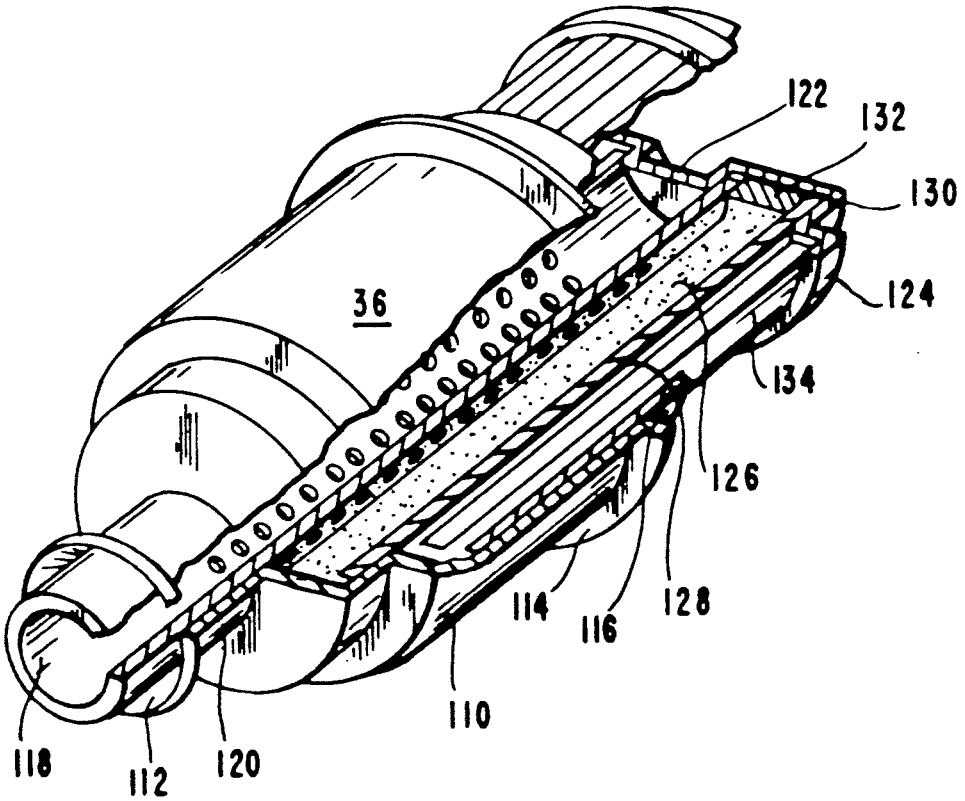
FIG. 7 is a partial cut-away cross-sectional isometric view of the filter module.

Referring now to FIG. 7 the filter module 36 comprises a three tiered cylindrical housing 110 having a flanged hose end 112 and a flanged rear end 114. An outer cylinder member 116 is fixedly attached to the inside surface of housing 110 at the flanged rear end 114 and protrudes therefrom to accept the inlet filter end cap 18 and the center housing member 40. A partially perforated hose outlet tube 118 is axially aligned with the longitudinal axis of housing 110 and fixedly held therein on the outlet side by the small cylinder section 120 of housing 110. The other end of hose outlet tube 118 is supported by a central boss 122 of a stamped filter end support member 124. Cylindrically shaped activated charcoal material 126 is operatively disposed in the space intermediate the outer circumference of hose tube 118 and the inner surface of a perforated middle cylinder member 128. The annular groove 130 of filter end cap 124 supports a compression pad 132 therein and also support the inlet end of middle cylinder 128. Disposed intermediate to the outer surface of perforated middle cylinder member 128 and the inner surface of outer housing cylinder 116 is a cylindrically shaped pleated particulate filter 134 which is supported therein by the flange of end cap 124.

Figure 8:
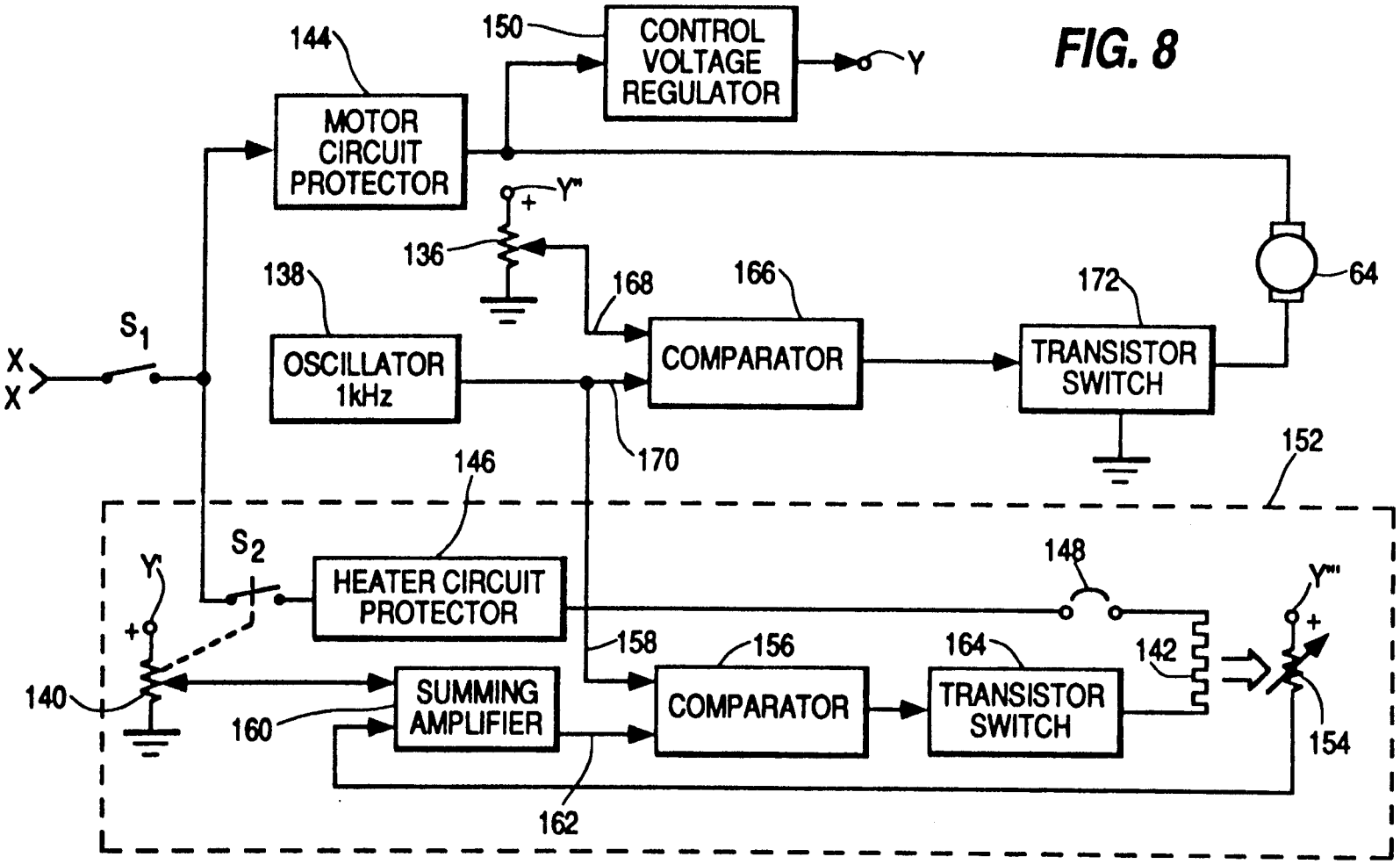
FIG. 8 is a schematic electrical diagram of the electrical control module for controlling motor speed, heater temperature and on-off switching.

Referring not to the block diagram of FIG. 8, the 27.5 VDC vehicle electrical power goes via input terminal x-x through a unit on/off switch S1. As previously stated the unit on/off switch S1 is located in the rear housing 46 portion of the GPFU and is activated by the air inlet cap 42. This arrangement interlocks the heater 142 with the motor/blower control assuring that the heater 142 cannot be activated without the GPFU operating. The speed of the high speed motor 64 is controlled through a potentiometer 136 whose output is set by an operator for a desired motor speed and air flow. The 27.5 VDC power is also supplied to heater circuit via an in series connected heat on/off switch S2. Both the heater and motor circuits use the same pulse width modulation system. An oscillator 138 is used to generate pulses at 1 kHz with the pulse width determined by the operator at selected positions of motor speed control potentiometer 136 and heater temperature potentiometer 140. The motor 64 senses a change in the pulse width and responds with a speed change. The 27.5 VDC is supplied to the motor 64 through a motor circuit protector 144 and to the heater 142 through heater circuit protector 146 via an in series connected safety thermostat 148, of the bimetalic type. The bimetal thermostat 148 provides for redundant over-temperature safety. This redundant feature assures the air temperature exiting the heater coil 142 will not exceed temperatures that will cause off-gassing of chemical agents. The 27.5 VDC power source is also used to power a control voltage regulator 150 having a 15 VDC regulated voltage output at terminal y'. The motor control and heater control circuits are connected to this 15 VDC source at terminals at y'', and y' and y''' respectively. The heater control circuit shown within the dashed line box 152 essentially provides voltage to the heater element 142 at a level selected by the operator. Feedback to this control circuitry is provided by a thermistor 154. The switching frequency used in heater control circuit is determined by the triangular wave output 1 kHz oscillator 138. The triangular waveform output is one of the inputs to a differential comparator 156 via conductor 158. The other input to comparator 156 comes from the output of a summing amplifier 160 via conductor 162. Inputs to the summing amplifier 160 are from the temperature selected by the operator by his setting the heater potentiometer 140 output level and the feedback voltage from the thermistor temperature sensor 154. The heater control comparator 156 directly drives a transistor power switch 164. The transistor switch 164 supplies pulses of current to the heater element 142 at a 1 kHz rate. The pulse width determines the net heater voltage and thus the heater power output. This closed loop control circuit can control and maintain the temperature of 100° F. The high switching rate of 1 kHz causes the heating element 142 to respond only to pulse width changes. This control minimizes the temperature excursions of the heating element 142 and results in a relaibel heating system. Another feature in the heater portion of the block diagram is the on/off switch S2 that is integral to the temperature select control potentiometer 140. Switch S2 shuts off the heater and a click-off position indicates to the user that he has turned the heater 142 off.

Referring now to motor control portion of FIG. 8, which is outside of dashed box 152, the motor speed control is an open loop controller that responds to the speed selected by the user. Both the heater circuitry and the motor speed controller circuitry use the same pulse width modulation system. A motor control comparator 166 generates output pulses 1 kHz with the pulse width determined by the user selected position of the speed control potentiometer 136. The output of the speed potentiometer 136 is fed to the input of the comparator 166, via conductor 168. The other input to the comparator 166 is fed by conductor 170 from the oscillator 138. The motor 64 senses a change in the pulse width output of comparator 166 through a motor transistor switch 172 and thereto with a speed change. The pulse width modulation system used in conjunction with the motor power transistor 172 switches the motor field windings and results in a simple and very efficient speed control. Maximum speed, limited by motor/blower characteristics, produces maximum rated airflow and minimum speed produces an airflow of approximately 1 cfm.

While a specific embodiment of the invention has been shown and described in detail to illustrate the application of the principles of the invention, it will be understood that the invention may be embodied otherwise without departing from such principles.

What is claimed is:

1. A gas particulate filter system for supplying heated clean air to a gas face mask of an operator of a military vehicle subject to ambient environments containing nuclear, biological or chemical contaminants which comprises:

replaceable radial flow filter canister means for holding an activated cylindrical charcoal filter proximate to a cylindrically pleated filter;

radial flow blower/heater means for supplying dust free temperature controlled air to said filter canister at an adjustable air flow rate;

continuously variable electronic control means for controlling both air temperature and air flow to said filter canister; and "V" type clamp means for rapidly joining said filter canister means to said blower/heater means and to the gas face mask of said operator.

2. A gas particulate filter system as recited in claim 1 wherein said filter canister means includes:

a three tier cylindrical housing having a flanged rear end and a flanged outlet hose end;

a perforated outlet hose tube operatively disposed and attached to said outlet hose end;

cylindrically shaped activated charcoal member proximately positioned in said three tier housing adjacent to said perforated tube;

a perforated cylindrical middle cylinder fixedly attached to a middle tier of said three tier housing, said middle cylinder and outlet hose providing an annular space therebetween for holding said charcoal;

a pleated cylindrically shaped particulate filter operatively disposed intermediate said middle cylinder member and said housing and protruding out of said flanged rear end;

an annular grooved filter end cap fixedly attached to one end of said outlet hose tube and to one end of said middle cylinder member; and a compression pad operatively disposed in said annular end cap intermediate said outlet hose tube and said middle cylinder member for abuting against an end of said charcoal.

3. A gas particulate filter system as recited in claim 2 wherein said filter canister means includes:

a hose end cap for covering said outlet hose end; and an inlet filter end cap for covering said flanged rear end;

said hose end cap and inlet filter end cap providing a means for storing unused replacement gas particulate filter canister and protecting the activated charcoal member from being exposed to ambient contaminants and for protecting said operator from used contaminated filter canisters.

4. A gas particulate filter system as recited in claim 3 wherein said radial flow blower/heater means includes:

a cylindrically shaped center housing having a flanged outlet end and a flanged rear end;

a heater assembly operatively positioned adjacent to said center housing rear end;

a centrifugal blower assembly operatively disposed in axial alignment with said heater assembly;

an electronic module operatively located on said blower assembly for continuously controlling airflow rate and temperature to said filter canister means;

a cylindrical rear housing member having a flanged outlet end and an inlet rear end, said inlet rear end of said rear housing member includes an annularly disposed rain shield and a retaining member; and an air intake dust cover assembly removably attached to said rear housing member by said retaining member.

5. A gas particulate filter system as recited in claim 4 wherein said clamp means included:

a first "O" ring packing seal member sized to operatively fit said flanged outlet hose end;

a second "O" ring packing seal member operatively disposed intermediate the flanged rear end of said filter canister and said flanged outlet end of said rear housing; and a third "O" ring packing seal member operatively disposed intermediate said rear flange of said center housing and flanged outlet end of said rear housing.

6. A gas particulate filter system as recited in claim 5 wherein said dust cover assembly includes:

a cylindrical end cap cover having a closed end with peripherally disposed screw holes therein and an open end;

an air inlet seal member fixedly held next to said end cap cover;

a spring stop member disposed intermediate said rain shield and said end cap cover;

a coiled compression spring operatively positioned intermediate said cap cover and said spring stop member;

a metal wiper ring is operatively spaced from said end cap cover;

a rear ring support member is disposed intermediate said metal wiper ring and said end cap cover;

a sintered metal disc shaped prefilter member is sandwiched between said metal ring wiper member and said rear ring support;

a front ring support wiper member holding said wiper ring against the rear side of said prefilter member;

screw means for fixedly holding said prefilter member spacedly attached to said cap cover closed end and permitting said wiper ring to slidably ride against the interior surface of said rear housing; and switch means operatively disposed in said cover assembly to mechanically link the gas particulate unit operation with the opening and closing of said air intake dust cover assembly.

7. A gas particulate filter system as recited in claim 4 wherein said electronic module includes:

motor control pulse width modulation circuit means for responding to a speed selected by said operator for supplying dust free air to said filter canister at an adjustable air flow rate of one (1) cubic foot per minute to four (4) cubic feet per minute at a water head of eleven (11) inches; and heater control pulse width modulation circuit means for responding to a temperature selected by said operator for supplying dust free air to said filter canister at a temperature not to exceed 100° F.

8. A gas particulate filter system as recited in claim 7 wherein said motor control pulse width circuit means includes:

oscillator means for generating pulses at 1 kHz;

motor potentiometer means for generating an output set by said operator for a desired motor speed and air flow;

comparator means having a first input electrically connected to the output voltage of said motor potentiometer and a second input electrically connected to the output of said oscillator for generating a change in the pulse width output of said comparator;

transistor switch means electrically connected in series to the output of said comparator for generating output pulses;

motor means for sensing a change in the pulse width output of said transistor means thereby switching the motor field windings of said motor means resulting in speed control; and switch means actuated by said air intake dust cover assembly for interlocking said heater control circuit means with said motor control circuit means for assuring said heater assembly cannot be actuated without operation of said motor means.

9. A gas particulate filter system as recited in claim 8 wherein said temperature pulse width circuit means includes:

temperature potentiometer means for generating an output voltage at a level selected by said operator;

a summing amplifier having a first input connected to the output of said temperature potentiometer;

a thermistor positioned in proximity of said heater assembly for providing feedback to the control circuitry of said heater assembly by supplying a second input to said summing amplifier;

second comparator means compares the output signal of said summing amplifier with the output of said oscillator means for generating a triangular waveform output;

second transistor switch means electrically connected to the output of said second comparator means for generating pulses of current at a 1 kHz rate;

a bimetallic thermostat connected in series with said heater assembly to said switching means thereby providing redundant over-temperature safety.

* * * * *